United States Patent [19]

Qualls

[11] Patent Number: 4,653,254

[45] Date of Patent: Mar. 31, 1987

[54] AUXILIARY POWER APPARATUS

[76] Inventor: Charles W. Qualls, 423 N. Riverside, Savannah, Tenn. 38372

[21] Appl. No.: 769,750

[22] Filed: Aug. 27, 1985

[51] Int. Cl.⁴ ............................................. A01D 35/26
[52] U.S. Cl. ..................................... 56/16.9; 56/13.7
[58] Field of Search .................... 56/13.7, 11.8, 16.9, 56/12.7

[56] References Cited

U.S. PATENT DOCUMENTS

| | | | |
|---|---|---|---|
| 2,790,292 | 4/1957 | Trecker | 56/16.9 |
| 4,152,882 | 5/1979 | Howard | 56/13.7 |
| 4,242,855 | 1/1981 | Beaver, Jr. | 56/16.9 |

*Primary Examiner*—Gene Mancene
*Assistant Examiner*—David L. Tarnoff
*Attorney, Agent, or Firm*—Wegner & Bretschneider

[57] ABSTRACT

Auxiliary power apparatus having particular application to motor-driven lawn and garden devices is described. The auxiliary power apparatus operates an auxiliary load from a motor power source on, for example, the lawn and garden equipment in question. A collar member is fixedly attached to the drive shaft of a rotary power source. A flexible drive shaft including a flexible driven shaft and a flexible sleeve arranged about the driven shaft is connected at one end to the mechanical load by means of a driven shaft. A second end of the driven shaft ends in a shaft extension member. The collar member is formed to receive the shaft extension member and a second locking member is arranged at the second end of the flexible sleeve for releasable engagement with a locking member on the collar. Thus, the flexible drive shaft is releasably connected to the collar which in turn is connected to the drive shaft of the power source.

5 Claims, 3 Drawing Figures

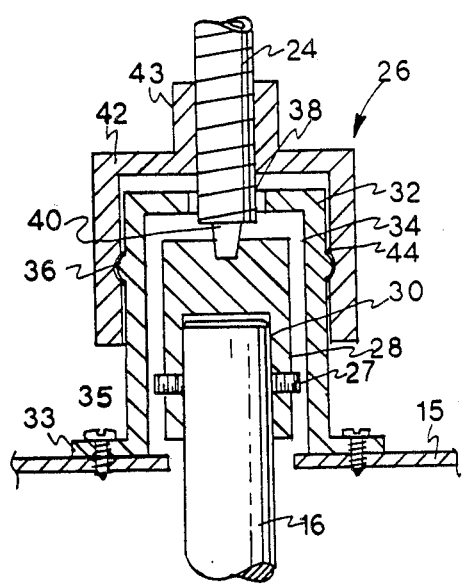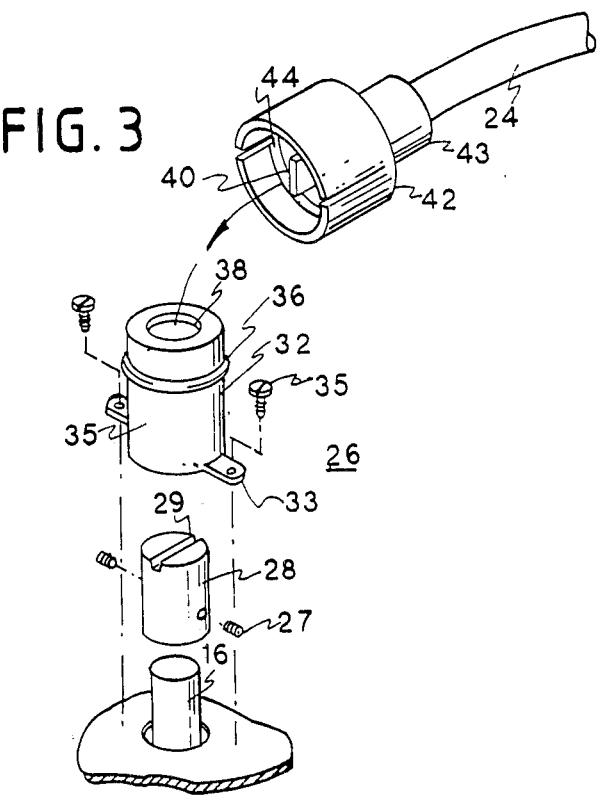

AUXILIARY POWER APPARATUS

BACKGROUND OF THE INVENTION

This invention is directed to the field of auxiliary power sources connectable to a primary power source having a rotating drive shaft. More particularly, the invention is concerned with apparatus for easily, releasably connecting an external mechanical load to the drive shaft of the power source, while reliably transmitting drive to the mechanical load.

The invention has particular application in connection with lawn and gardening devices which use engines having rotating drive shafts for operating a primary mechanical load, such as a rotating blade or the like. An example of such an application is the connection of a trimmer having a rotating operating member to the drive shaft, for example, a rotary lawn mower.

Power take-off attachments of this type in the prior art are typically connected to the bottom of the lawn mower crank shaft by a pulley or belt arrangement or through the use various forms of gears and levers. It is the usual case that such attachments have to be installed on the lawn mower or the like during the original manufacture of that device because the connection in question to the crank shaft, at its bottom end, will be relatively complex.

It is important to note that the usual form of prior art device of this type is directly connected to the source of power and there is no means provided for operating the secondary or auxiliary load, such as the trimmer, at a location some distance away from, for example, the rotary mower.

In the limited circumstances, such as in U.S. Pat. No. 4,242,855 where a flexible drive shaft is provided to allow an operator to use a trimmer away from the mower, the connecting mechanism between the drive shaft and the driven shaft is of relatively complex construction, difficult to connect and disconnect and not readily adaptable to existing mower drive shaft structures.

It is, therefore, an object of this invention to provide an auxiliary power unit connectable to the primary power source which is of simple construction and is easily connectable and disconnectible.

It is another object of this invention to provide such an auxiliary power source which can readily be used with existing drive shaft structures.

Another object of this invention is to provide a simple and easily operable assemblage of parts which may be readily utilized with the existing structure of a drive shaft in a rotating power source to accomplish the foregoing objects.

SUMMARY OF THE INVENTION

The foregoing and other objects are achieved in an auxiliary power apparatus or power take-off apparatus for operating an auxiliary mechanical load in accordance with the principles of the invention. A common member is provided which is arranged to be fixedly attached to the drive shaft of the motive power source. A flexible drive shaft including a flexible driven shaft and a flexible sleeve arranged thereabout provides the power connection from the power source to the mechanical load. A first end of the driven shaft is connected to the mechanical load, while a second end of it ends in a shaft extension member which is adapted to be received by the collar member.

A first locking member is arranged about the collar member and is fixedly attached to the power source deck or the like. A second locking member is arranged at the aforementioned second end of the flexible sleeve for engagement with the first locking member.

This provides a simple to construct, but positive and efficient power connection to the power source. Moreover, this arrangement provides for ready adaptation of the existing power source to operate the auxiliary mechanical load.

BRIEF DESCRIPTION OF THE DRAWINGS

FIG. 2 is a cross-section taken along the line 2—2 of a preferred embodiment of apparatus for connecting the flexible drive shaft to the rotating drive shaft of the power source.

FIG 3 is an exploded, perspective view of the FIG. 2. embodiment.

DESCRIPTION OF THE PREFERRED EMBODIMENT

Figure 1:
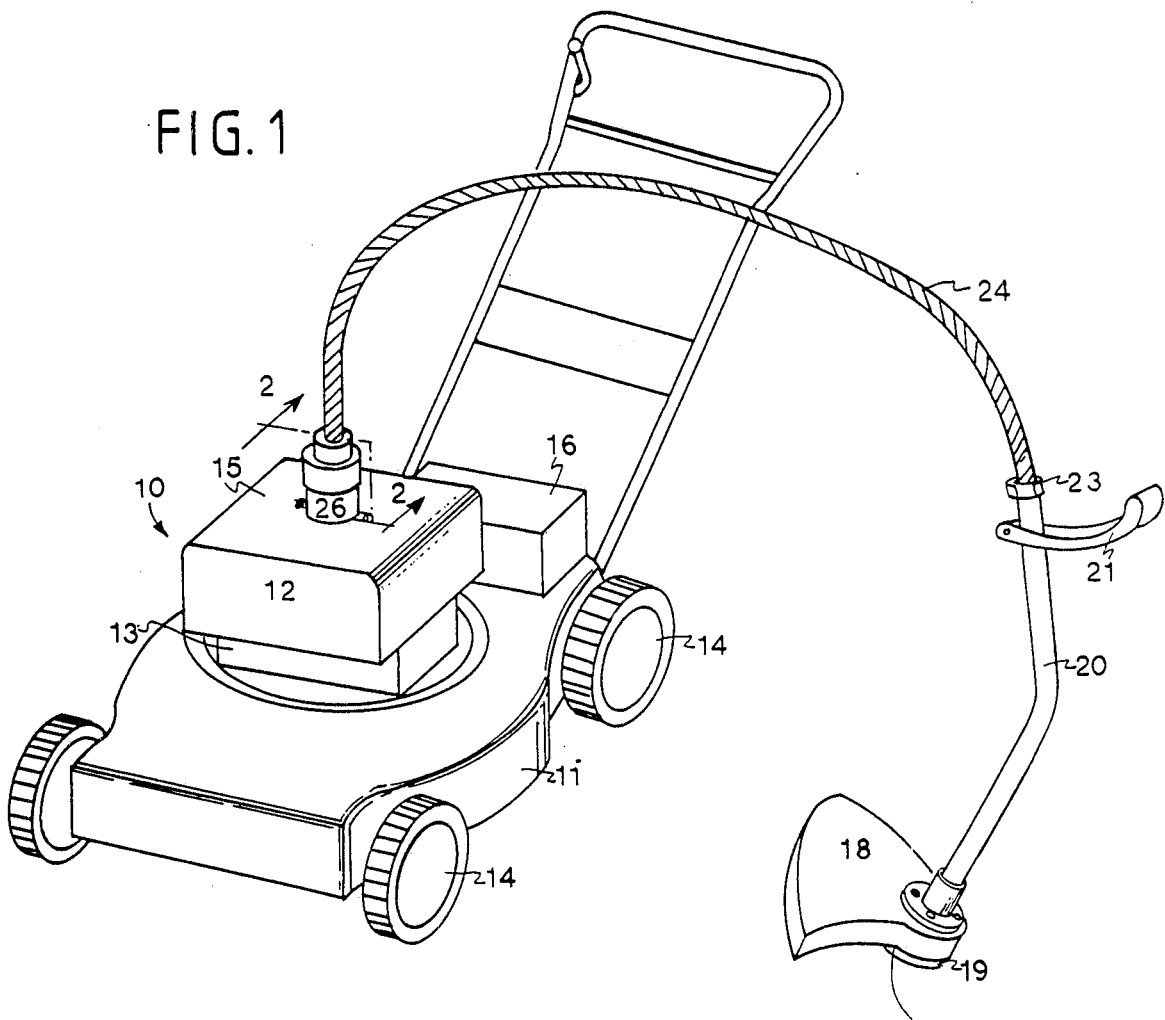
FIG. 1 is a perspective view of a rotary lawn mower utilizing the principles of the invention to connect a flexible drive shaft thereto to operate a trimmer.

In order to facilitate an understanding of the principles of the invention a preferred embodiment is described by describing the application of the invention to the connection of a grass trimmer to a rotary lawn mower.

The various reference numerals used hereinbelow in conjunction with the various figures refer to like parts in each of these figures.

Referring to FIG. 1 there is shown a rotary lawn mower 10 of conventional construction having a mainframe 11 and an engine 12 which may be of the internal combustion of electric types. Four wheels 14 are rotatably mounted on the mainframe 11. In this case an internal combustion engine is shown, and accordingly, a fuel tank 16 is provided to supply that engine.

Engine 12 includes an engine block 13 and engine housing 15. The engine is provided with a rotating drive shaft 16 which extends upwardly through engine housing 15.

The rotary power mower, which is of conventional construction, will not be described further herein. However, in such mowers the drive shaft has a bottom end extending downwardly beneath the frame which is connected to a rotatable cutting head.

In the illustrated embodiment there is shown an auxiliary mechanical load 18 in the form of a trimmer having a rotating head 19. The trimmer includes a rigid shaft 20 having connected at its upper end an operating handle 21. Within shaft 20 there is (not shown) a rotating driven shaft. Again, this trimmer is of conventional construction and will not be described further herein.

The rotating driven shaft, which is not shown in this figure, becomes flexible at end 23 of trimmer shaft 20. The flexible driven shaft then extends through a flexible sleeve 24 to be connected to the drive shaft 16 of engine 12. Adapter assembly 26 to be described more fully hereinbelow couples the driven shaft to drive shaft 16 in accordance with the principles of this invention.

Referring to FIGS. 2 and 3 the details of the construction of adapter assembly 26 and its relationship to the drive shaft 16 and flexible driven shaft 28 are shown.

Adapter assembly 26 includes a collar member 28 having a cylindrical inset 30 adapted to receive cylindrically shaped drive shaft 16. Collar 28 is fixed in place on drive shaft 16 by means of set screws 27.

Surrounding collar 28 is a first cylindrical locking member 32 having a pair of brackets 33, through holes in which screws 35 mount the first locking member on engine housing 15. Locking member 32 includes a cylindrical interior surface 34 which, although it surrounds the collar 28, it does not engage it so that the drive shaft 16 and collar 28, when attached thereto, freely rotates within the interior of the locking member. The exterior surface 35 of the first locking member includes a shoulder member 36 extending circumferentially therearound, and an opening 38 is arranged in its upper surface.

As previously discussed, a flexible driven shaft (not shown) extends through the flexible sleeve 24 for driving engagement with motor 12 and the auxiliary mechanical load or trimmer 18. At the end of driven shaft nearest motor 12, the driven shaft ends in a shaft extension member 40 of a flathead shape adapted to engage with a slot 29 in the top end of collar 28. The positive engagement of shaft extension 40 with slot 28 allows the rotary drive motion of drive shaft 16 transmitted through collar 28 to be received by the rotatable driven shaft within. A coupling collar 42 forming a second locking member of a hollow cylindrical shape is arranged around the flexible shaft 24 and is of a dimension to extend around and engage with or embrace first locking member 32. At its upper end coupling member 42 diminishes in diameter at section 43 thereof to slidingly engage with flexible shaft 24. Accordingly, for purposes of operation the coupling member 42 moves longitudinally of shaft 24 in order to engage with the first locking member 32. When the coupling member 42 is fully extended a recess 44 extending circumferentially about the interior thereof engages with the circumferential shoulder 36 extending around locking member 32. In order for this engagement to occur it may be necessary for coupling member 42 to be made of a material which will allow it to flex radially outwardly depending on the dimensions used for the engaging pairs. This produces the positive engagement needed to hold the first and second locking members together.

As can be seen from the foregoing description, in order to adapt the rotary lawn mower 10 in this preferred embodiment to drive an auxiliary mechanical load such as trimmer 18 only a few steps need be followed. It is necessary only to attach collar 28 to drive shaft 16 in the manner described. Following this, first locking member 32 is mounted on the housing 15 of engine 12, and with this second operation the mower is fully adapted to receive the auxiliary mechanical load at the end of the flexible drive shaft to which is adapted as described hereinabove. In order to simply connect the auxiliary mechanical load to the rotary mower in this case it is necessary only to push shaft extension member 40 through the opening 38 in first locking member 32 so that the shaft extension member engages with slot 29 in collar 28. Following this, coupling member 42 is pushed down over first locking member 32 so that the shoulder and recess engage. At this point, the auxiliary mechanical load is fully locked in place on the mower and can receive rotating mechanical energy from the mower.

The description of the preferred embodiment given herein above is for purposes only of providing an example of the application of the principles of the invention.

Those skilled in the art will be aware that a variety of mechanical loads can be driven as described above and that a variety of power sources having differing functions can be used to drive the foregoing auxiliary mechanical loads.

I claim:

1. A power take-off apparatus for operating an auxiliary mechanical load from a motive power source, comprising:
    collar means fixedly attachable to the drive shaft of said motive power source;
    a first locking member arranged concentrically of and substantially surrounding said collar means, but not in rotating engagement therewith;
    flexible drive shaft means including a flexible driven shaft and a flexible sleeve arranged thereabout;
    a first end of said driven shaft being connectable to said auxiliary mechanical load;
    a second end of said drive shaft ending in a shaft extension member;
    said collar means having means for receiving said shaft extension member; and
    a second locking member arranged at the second end of said flexible sleeve, but not in rotating engagement with said shaft extension member, for selectively releaseable engagement with said first locking member for releasably connecting said flexible drive shaft to said collar means.

2. The power take-off apparatus defined in claim 1 wherein said first locking member comprises a substantially cylindrical member surrounding and coaxial with said collar means but not attached thereto, said cylindrical member having a shoulder portion on the exterior surface thereof and extending circumferentially therearound and wherein said second locking member comprises a flexible cylindrical member coaxial with and surrounding at least a portion of said shaft extension member, said interior surface of said flexible cylindrical member having a circumferential recess formed therein for receiving said shoulder portion, said flexible cylindrical member being radially flexible to receive said cylindrical member and then to exert a radially inward compressive force thereon.

3. The power take-off apparatus defined in claim 1 wherein said collar means is cylindrical and has an interior diameter sized to slideably receive and engage with said drive shaft and further comprises set screws which in the tightened position engage with said drive shaft to prevent relative rotation between said drive shaft and said collar means, and has slot-like means for receiving the outer end of said shaft extension member whereby said collar means drivingly engages said shaft extension member.

4. Adapter kit for modifying a motive power source having a drive shaft to drive an auxiliary mechanical load, comprising:
    collar means shaped and sized to slidingly engage with an end of said drive shaft whereby, when said motive power source is operating, said collar means rotates with said drive shaft, said collar means including means for receiving a driven shaft of said auxiliary mechanical load and to be in driving engagement therewith,
    a first locking means comprising a substantially cylindrical member adapted to be placed about said collar means, but not in driving engagement therewith, said cylindrical member having a shoulder portion on the exterior thereof and extending circumferentially therearound and a second locking member releasably attachable to said first locking member for connecting the auxiliary load driven shaft to said collar means, said second locking member being substantially cylindrical in shape having formed in its interior surface a circumferential recess for receiving said shoulder portion, said second locking member being radially flexible to receive said first locking member and then to exert a radially inward compressive force thereon.

5. The adapter kit defined in claim 4 wherein said collar means is cylindrical and includes a cylindrical interior surface having an interior diameter sized to slideably receive and engage with said drive shaft and further comprises set screws which in their tightened positions engage with said drive shaft to prevent relative rotation between said drive shaft and said collar means, and slot-like means for receiving the outer end of said shaft extension member whereby said collar means drivingly engages said shaft extension member.

* * * * *